United States Patent Office 3,290,330
Patented Dec. 6, 1966

3,290,330
ALKYL-SUBSTITUTED N-METHYLPYRROLI-
DINE-N-OXIDES
Maximilian I. Fremery, Oakland, and George A. Gillies, Berkeley, Calif., assignors to Shell Oil Company, New York, N.Y., a corporation of Delaware
No Drawing. Filed Oct. 11, 1965, Ser. No. 494,965
7 Claims. (Cl. 260—326.8)

This application is a continuation-in-part of copending application Serial No. 330,577, filed December 16, 1963, and now abandoned.

This invention relates to a novel class of heterocyclic compounds. More particularly, it relates to a novel class of alkyl-substituted pyrrolidine-N-oxides.

Numerous examples of tertiary amine-N-oxides are available in the art. Such materials have recognized utility as fungicides, stabilizers, textile finishing agents, surfactants and the like. Recent emphasis has been placed upon tetriary amine-N-oxides which possess one straight-chain higher alkyl group and two methyl groups as substituents on the nitrogen atom. Such higher alkyl dimethyl amine-N-oxides have found utility as active ingredients in high-foaming light-duty household detergents. Because of the biodegradable nature of such compounds commercial interest in amine oxide surface active agents is increasing. Although many typical amine oxides show high-foaming properties and others exhibit good cotton detergency, few materials demonstrate utility in both respects. For example, it is frequently necessary to add a foam-producing agent to a surfactant possessing good cotton detergency in order to obtain a desirable foam level in practical operation. It would be of considerable value to provide a class of surface active agents that incorporate high-foaming properties and a high fabric detergency.

It is an object of this invention to provide a novel class of heterocyclic compounds. More particularly, it is an object to provide a class of novel alkyl-substituted N-alkyl-pyrrolidine-N-oxides which possess a higher alkyl substituent upon at least one ring carbon atom. A further object is to provide a class of novel higher alkyl-substituted N-methylpyrrolidine-N-oxides, which compounds are eminently suited for use as surface active agents.

It has now been found that these objects are accomplished by the provision of 1-methyl-2-alkyl-3-(non- to mono-alkyl)pyrrolidine-1-oxides wherein at least one alkyl is higher alkyl. Such compounds incorporate the polar nitrogen-oxygen bond of other amine oxides, and yet demonstrate superior properties of detergency and foam production. It is believed that such superiority results in part from the increased accessibility of the polar bond due to the sterically small and/or spacially immobile character of the groups attached to the nitrogen atom.

The pyrrolidine-N-oxides of the invention are hydrocarbon amine oxides, that is, contain only atoms of carbon and hydrogen besides the nitrogen and oxygen of the amine oxide moiety, and are free from carbon-carbon unsaturation. A particularly useful class of such compounds, i.e., the 1-methyl-2-alkyl-3-(non- to mono-alkyl) pyrrolidine-1-oxides wherein at least one of said alkyls is higher alkyl, is represented by the formula

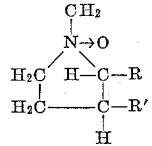

wherein R is alkyl, preferably straight-chain alkyl, having from 1 to 18 carbon atoms, R' is hydrogen or R, and at least one of R and R' is alkyl having at least 8 carbon atoms. Particularly suitable are the 1-methyl-2-alkyl-3-(non- to mono-alkyl)pyrrolidine-1-oxides of the above-depicted formula wherein R and R' have a total of from 8 to 18 carbon atoms, especially a total of from 10 to 16.

Illustrative of such compounds are 1-methyl-2-octylpyrrolidine-1-oxide,
1-methyl-2-decylpyrrolidine-1-oxide,
1-methyl-2-dodecylpyrrolidine-1-oxide,
1-methyl-2-tetradecylpyrrolidine-1-oxide,
1-methyl-2-octadecylpyrrolidine-1-oxide,
1,3-dimethyl-2-undecylpyrrolidine-1-oxide,
1-methyl-2,3-dioctylpyrrolidine-1-oxide,
1-methyl-2-hexadecylpyrrolidine-1-oxide,
1-methyl-3-butyl-2-decylpyrrolidine-1-oxide and the like.

Preferred pyrrolidine-N-oxides of the above-depicted formula are those compounds wherein R' is hydrogen, that is, 1-methyl-2-alkylpyrrolidine-1-oxides wherein the alkyl substituent is alkyl, preferably straight-chain alkyl, having from 8 to 18 carbon atoms. The 1-methyl-2-alkylpyrrolidine-1-oxides having a straight-chain alkyl substituent of from 10 to 16 carbon atoms comprise an especially preferred class, in part because of the outstanding properties thereof.

To produce the pyrrolidine-N-oxides of the invention, the corresponding alkyl-substituted N-methylpyrrolidines are employed as starting materials. These pyrrolidines, also novel compounds, are most easily prepared by the reaction of N-methylethylenimine with an acyclic monoolefin which contains two more carbon atoms than the alkyl side chain(s) of the desired pyrrolidine. Uncatalyzed, thermal addition occurs at elevated temperatures and results in production of the alkyl-substituted N-methylpyrrolidine in comparably high yield. For example, N-methylethylenimine reacts with 1-dodecene at elevated temperatures, e.g., 325° C., to produce 1-methyl-2-decylpyrrolidine. The production of pyrrolidines by this method and certain pyrrolidines prepared thereby are described more fully and claimed in a co-pending application U.S. Serial No. 330,578, by M. I. Fremery, now U.S. Patent No. 3,228,957.

The pyrrolidine reactants are converted to the pyrrolidine-N-oxides of the invention by a variety of methods. Typical methods include reaction of the pyrrolidine with peracid, e.g., organic carboxylic peracids such as paracetic acid and perbenzoic acid as well as inorganic peracids such as permolybdic acid and pertungstic acid. The peracid may be employed as a preformed material or prepared in situ by reaction of hydrogen peroxide with the corresponding acid or salt thereof, and the reaction is customarily conducted in an appropriate solvent such as a lower alkanol, e.g., tert-butanol. It is generally preferred, however, to employ direct oxidation of the pyrrolidine to the corresponding N-oxide by reaction with hydrogen peroxide. In a typical process, the pyrollidine is heated somewhat above ambient temperature, e.g., to about 50–75° C., and an excess of hydrogen peroxide, a 25–100% molar excess for example, is added in increments while the reaction mixture is agitated. Water is frequently added to the mixture during reaction to maintain the fluidity of the system and the mixture is maintained at reaction temperature until reaction is complete, customarily a period of from about 1 to about 4 hours. Subsequent to reaction, the pyrrolidine-N-oxide product is separated and recovered by conventional means such as fractional distillation under high vacuum, selective extraction followed by solvent removal or the like.

Such processes of isolation are frequently difficult due to the somewhat hygroscopic nature of the amine oxide and/or a tendency of the pure oxides to decompose when heated to elevated temperatures. For most applications, isolation or purification is neither required nor advantageous, and the amine oxide is utilized in the aqueous medium of its production. The solutions resulting from amine oxidation are diluted with water, aqueous alcohol or other materials to produce solutions containing from about 10% to about 50% by weight of amine oxide, which solutions may be employed without further purification. Alternatively, the amine oxide solution may be dried in the presence of salts, e.g., sodium sulfate, and employed in powders and like solids.

As previously stated, the pyrrolidine-N-oxides of the invention are useful surfactants, and are particularly suitable for use as foam producers and detergents. The amine oxides may be formulated in aqueous or aqueous alcoholic solutions and may be employed alone or in conjunction with other organic materials such as alkylbenzene sulfonates, higher alkanol sulfates and sulfonates, ethoxylated alcohol sulfates and ethoxylated alkylphenol sulfates, long chain alkanols or alkanoic amides, glycerol carboxylates and ether sulfonates, various trialkylamine oxides and polyolefins such as polystyrene, as well as inorganic materials such as alkali and ammonium sulfates, silicates, polyphosphates, particularly tripolyphosphates, and the like. Alternatively, the amine oxides may be formulated with binders and other solids in solid heavy-duty detergent compositions.

The utilization of the N-methylpyrrolidine-N-oxides of the invention is not restricted to the utilization of a single material, and satisfactory results are often obtained when a mixture of pyrrolidine-N-oxides is employed. For example, in an application where the use of 1-methyl-2-dodecylpyrrolidine-1-oxide is preferred, satisfactory results are often obtained through the use of a mixture of 2-decyl-, 2-dodecyl and 2-tetradecyl pyrrolidine derivatives employed in such a ratio that the average alkyl chain length approximates 12. Such mixtures are principally obtained when a mixed olefin feed is employed in the initial production of the pyrrolidine by olefin condensation with N-methylethylenimine. Conversion of the resulting mixture of pyrrolidines to the corresponding amine oxides would result in a mixture of amine oxides of varying chain length.

To further illustrate the production and utilization of the novel amine oxides of the invention, the following examples are provided. It should be understood that they are not to be regarded as limitations, as the teachings thereof may be varied as will be understood by one skilled in this art.

*Example I*

To an autoclave were charged 150 g. of 1-decene and 0.3 g. of sodium hydroxide and the mixture was maintained at 325° C. while 15 g. of N-methylethylenimine was added over a 60 minute period. After an additional 30 minute reaction period at 325° C., the product mixture was filtered and subsequently distilled at reduced pressure. The product, 1-methyl-2-octyl-pyrrolidine, B.P. 85° C. at 0.5 mm., was obtained in a yield of 66% based upon a 66% conversion of N-methylethylenimine. The structure of the product was confirmed by mass spectrometric analysis and by the nuclear magnetic resonance spectrum which was consistent with the above structure. The product had the following elemental analysis.

|  | Anal. Calc. | Found |
| --- | --- | --- |
| C, percent wt | 79.2 | 78.9 |
| H, percent wt | 13.7 | 13.7 |
| N, percent wt | 7.1 | 6.7 |

*Example II*

To an autoclave were charged 150 g. of 1-dodecene and 0.3 g. of sodium hydroxide and the mixture was maintained at 325° C. while 15 g. of N-methylethylenimine was added during a 60 minute period. After an additional 30 minute reaction period at 325° C., the product mixture was filtered and distilled at reduced pressure. The product, 1-methyl-2-decylpyrrolidine, B.P. 97° C. at 0.3 mm., was obtained in a 70% yield based upon a 67% conversion of N-methylethylenimine. The structure of the product was confined by mass spectrometric analysis and by the nuclear magnetic resonance spectrum which was consistent with the above structure. The product had the following elemental analysis.

|  | Anal. Calc. | Found |
| --- | --- | --- |
| C, percent wt | 80.0 | 80.4 |
| H, percent wt | 13.8 | 13.8 |
| N, percent wt | 6.2 | 6.0 |

*Example III*

To an autoclave were charged 150 g. of 1-tetradecene and 0.3 g. of sodium hydroxide and the mixture was maintained at 325° C. while 15 g. of N-methylethylenimine was added over a 60 minute period. After an additional 30 minute period at 325° C. the product mixture was filtered and distilled at reduced pressure. The product, 1-methyl-2-dodecylpyrrolidine, B.P. 112° C. at 0.1 mm., was obtained in a yield of 75% based upon a 75% conversion of N-methylethylenimine. The structure of the product was confirmed by mass spectrometric analysis and by the nuclear magnetic resonance spectrum which was consistent with the above structure. The product had the following elemental analysis.

|  | Anal. Calc. | Found |
| --- | --- | --- |
| C, percent wt | 80.6 | 80.4 |
| H, percent wt | 13.9 | 13.9 |
| N, percent wt | 5.5 | 5.4 |

*Example IV*

To an autoclave were charged 150 g. of 1-hexadecene and 0.3 g. of sodium hydroxide and the mixture was maintained at 325° C. while 15 g. of N-methylethylenimine was added over a 60 minute period. After an additional 30 minute period at 325° C. the product mixture was filtered and subsequently dissolved in 250 ml. of 2 N hydrochloric acid. The aqueous layer was extracted several times with diethyl ether until it remained clear, and addition of 50 g. of sodium hydroxide in the aqueous phase precipitated the 1-methyl-2-tetradecylpyrrolidine product which was then distilled at reduced pressure. The 1-methyl-2-tetradecylpyrrolidine, B.P. 156° C. at 0.05 mm., was obtained in a yield of 73% based upon a 73% conversion of N-methylethylenimine. The structure of the product was confirmed by mass spectrometric analysis and by the nuclear magnetic resonance which was consistent with the above structure. The product had the following elemental analysis.

|  | Anal. Calc. | Found |
| --- | --- | --- |
| C, percent wt | 81.1 | 81.4 |
| H, percent wt | 13.9 | 13.8 |
| N, percent wt | 5.0 | 4.8 |

*Example V*

When 9-octadecene is reacted with N-methylenimine by a procedure similar to that of Example I, a good yield of 1-methyl-2,3-dioctylpyrrolidine is obtained.

Example VI

To 26 g. (0.092 mole) of 1-methyl-2-tetradecylpyrrolidine maintained at 60° C. was added 15 g. (0.132 mole) of 30% hydrogen peroxide. The hydrogen peroxide was added slowly and in small portions and the reaction mixture was stirred during the addition. The mixture became viscous and 150 ml. of water was added. Heating was continued for three additional hours, during which time the viscosity of the solution gradually decreased. No more water was added.

The composition of the product mixture was determined by a potentiometric titration method known to be operative for analysis of solutions containing amine oxide. The product mixture was heated for approximately 0.5 hour with an excess of acetic anhydride. Upon cooling, the solution was titrated with perchloric acid in dioxane to determine the unreacted pyrrolidine and the amide which resulted from reaction of the amine oxide with acetic anhydride. Analysis in this manner indicated the aqueous solution resulting from the above pyrrolidine oxidation contained 13.5% 1-methyl-2-tetradecylpyrrolidine-1-oxide and 1.52% of the unreacted amine.

Example VII

By a procedure similar to that of Example VI, aqueous solutions of other 1-methyl-2-alkylpyrrolidine-1-oxides were prepared.

From 24 g. of 1-methyl-2-octylpyrrolidine and 19 g. of 30% hydrogen peroxide was prepared a solution which analysis indicated contained 25.2% by weight 1-methyl-2-octylpyrrolidine-1-oxide and 1.97% by weight 1-methyl-2-octylpyrrolidine. In like manner, from 24 g. of 1-methyl-2-decylpyrrolidine and 20.3 g. of 30% hydrogen peroxide was prepared a solution which contained 13.1% w. 1-methyl-2-decylpyrrolidine-1-oxide and 2.25% 1-methyl-2-decylpyrrolidine, and from 24 g. of 1-methyl-2-dodecylpyrrolidine and 15.9 g. of 30% hydrogen peroxide was prepared a solution which contained 17.7% w. 1-methyl-2-dodecylpyrrolidine-1-oxide and 2.53% w. 1-methyl-2-dodecylpyrrolidine.

Example VIII

Several 1-methyl-2-alkylpyrrolidine-1-oxides were evaluated for foam performance in a simulated dishwashing test. In this test, solutions of amine oxides to be tested were prepared containing 0.25 g./l. of amine oxide and 150 p.p.m. water hardness (Ca/Mg=60/40). The solutions were agitated to develop foam and increments of a Crisco-egg mixture ("simulated dishes") were added at 15-second intervals until the foam endpoint, i.e., the point at which the foam is destroyed. Each increment contained 0.4 g. of the soil, i.e., the Crisco-egg mixture. The number of increments added before the foam endpoint was used as a measure of the foam performance, and the results obtained from tests of 1-methyl-2-alkylpyrrolidine-1-oxides of varying alkyl chain lengths were compared with results from tests upon Onyx's Ammonyx LO, a lauryl-dimethylamine-N-oxide, which is an amine oxide having widespread commercial acceptance. The foam performance of the pyrrolidine-N-oxides was determined by taking the average of three determinations, and compared with the performance of the standard, to which an arbitrary value of 100 had been assigned.

| Length of 2-alkyl chain | Number of "simulated dishes" per determination | | | | Value |
|---|---|---|---|---|---|
| | No. 1 | No. 2 | No. 3 | Avg. | |
| C$_{10}$ | 31 | 27 | 37 | 31.0 | 86 |
| C$_{12}$ | 39 | 42 | 38 | 39.7 | 111 |
| C$_{14}$ | 39 | 36 | 35 | 26.7 | 103 |
| Ammonyx LO | 36 | 37 | 35 | 36.0 | 100 |

Example IX

In a similar simulated dishwashing test, 1-methyl-2-alkylpyrrolidine-1-oxides of varying alkyl chain length were evaluated using as "simulated dishes" 0.3 g. of Crisco on terrycloth. The number of "simulated dishes" added to foam endpoint was obtained from the average of 4 determinations, and the foam performance of the pyrrolidine-N-oxides was compared with the foam performance of Ammonyx LO, to which a value of 100 was assigned.

| Length of 2-alkyl chain | Number of "simulated dishes" per determination | | | | | Value |
|---|---|---|---|---|---|---|
| | 1 | 2 | 3 | 4 | Avg. | |
| C$_8$ | 1 | 1 | 1 | 1 | 1 | 5 |
| C$_{10}$ | 23 | 22 | 22 | 22 | 22.25 | 105 |
| C$_{12}$ | 26 | 26 | 25 | 24 | 25.25 | 119 |
| C$_{14}$ | 16 | 20 | 18 | 18 | 18 | 86 |
| Ammonyx LO | 21 | 19 | 21 | 21 | 20.5 | 100 |

Example X

The cotton detergency of 1-methyl-2-alkylpyrrolidine-1-oxides of various alkyl chain lengths was evaluated by preparing solutions of the amine oxides in water, which solutions had a concentration of 0.4 g./l. of amine oxide. Other materials were added in suitable amounts so that the resulting solution corresponded to that which would be obtained by employing a standard detergent formulation containing 20% w. amine oxide, 45% w. sodium tripolyphosphate, 7% w. sodium silicate (SiO$_2$/Na$_2$O=2.35), 23% w. sodium sulfate and 5% w. water, which formulation corresponds to that of solid, heavy-duty, high-foaming detergent compositions. The detergent solutions, 500 ml. of volume, also contained 150 p.p.m. water hardness (Ca/Mg=60/40). To each solution was added a cotton swatch obtained from the United States Testing Company which was impregnated with a mixture of carbon black, mineral oil and cottonseed oil. The solutions were agitated 20 minutes at 120° C. and 150 r.p.m., and the swatches were removed and dried. The cotton detergency of the amine oxides was determined by measuring the light reflectance of the swatches subsequent to washing, and comparing this value to the light reflectance of the switches before testing. In the table below, the term "s" refers to the reflectance of the swatches before testing, which in all cases was 22.6%. The reflectance after washing and drying is referred to by the term "w" which is also measured in percent reflectance. An average of w was obtained from 4 determinations and the difference in light reflectance before and after testing, w−s, was calculated. This value is directly proportional to the detergent efficiency of the amine oxide being tested. For comparison, the results were related to values obtained from testing of Ammonyx LO, a commercially employed amine oxide, to which an arbitrary value of 100 had been assigned.

| Length of 2-alkyl chain | W$_1$ | W$_2$ | W$_3$ | W$_4$ | W$_{avg}$ | W−S | Value |
|---|---|---|---|---|---|---|---|
| C$_8$ | 28.4 | 28.0 | 28.5 | 28.3 | 28.3 | 4.7 | 35 |
| C$_{10}$ | 37.2 | 38.2 | 37.0 | 37.6 | 37.7 | 15.1 | 93 |
| C$_{12}$ | 38.5 | 39.2 | 38.8 | 39.0 | 38.9 | 16.3 | 101 |
| C$_{14}$ | 39.2 | 39.5 | 39.3 | 42.1 | 40.1 | 17.4 | 107 |
| Ammonyx LO | 39.5 | 37.5 | 39.0 | 39.1 | 38.8 | 16.2 | 100 |

We claim as our invention:
1. The compound 1-methyl-2-alkyl-3-(non- to monoalkyl)pyrrolidine-1-oxide wherein all of said alkyls have from 1 to 18 carbon atoms and at least one alkyl has at least 8 carbon atoms.
2. The compound 1-methyl-2-alkyl-3-(non- to monoalkyl)-pyrrolidine-1-oxide wherein all of said alkyls are straight-chain alkyl having from 1 to 18 carbon atoms, and at least one alkyl has at least 8 carbon atoms.

3. The compound 1-methyl-2-alkyl-3-(non- to monoalkyl)-pyrrolidine-1-oxide wherein all of said alkyls are straight-chain alkyl, at least one alkyl has at least 8 carbon atoms, and all of said alkyls taken together have a total of from 8 to 18 carbon atoms.

4. The compound 1-methyl-2-alkylpyrrolidine-1-oxide wherein said alkyl is straight-chain alkyl having from 8 to 18 carbon atoms.

5. The compound 1-methyl-2-decylpyrrolidine-1-oxide.

6. The compound 1-methyl-2-dodecylpyrrolidine-1-oxide.

7. The compound 1-methyl-2-tetradecylpyrrolidine-1-oxide.

References Cited by the Examiner
UNITED STATES PATENTS
3,239,535  3/1966  Searles _____ 260—326.8

ALEX MAZEL, *Primary Examiner.*

MARY U. O'BRIEN, *Assistant Examiner.*